United States Patent
Greiner et al.

(10) Patent No.: US 10,802,184 B2
(45) Date of Patent: Oct. 13, 2020

(54) REFLECTIVE DIFFRACTION GRATINGS EMPLOYING EFFICIENCY ENHANCEMENT OR ETCH BARRIER LAYERS

(71) Applicant: Finisar Corporation, Sunnyvale, CA (US)

(72) Inventors: Christoph M. Greiner, Eugene, OR (US); Thomas W. Mossberg, Eugene, OR (US); Dmitri Iazikov, Eugene, OR (US)

(73) Assignee: II-VI Delaware Inc., Wilmington, DE (US)

( * ) Notice: Subject to any disclaimer, the term of this patent is extended or adjusted under 35 U.S.C. 154(b) by 352 days.

(21) Appl. No.: 14/698,789

(22) Filed: Apr. 28, 2015

(65) Prior Publication Data
US 2015/0309220 A1 Oct. 29, 2015

Related U.S. Application Data

(60) Provisional application No. 61/985,405, filed on Apr. 28, 2014.

(51) Int. Cl.
*G02B 5/18* (2006.01)

(52) U.S. Cl.
CPC ............. *G02B 5/1861* (2013.01); *G02B 5/18* (2013.01); *G02B 5/1809* (2013.01);
(Continued)

(58) Field of Classification Search
CPC ...... G02B 5/1871; G02B 5/1866; G02B 5/18; G02B 5/1809; G02B 5/1847;
(Continued)

(56) References Cited

U.S. PATENT DOCUMENTS

| 4,490,440 A | 12/1984 | Reber |
| 4,512,638 A | 4/1985 | Sriram et al. |

(Continued)

FOREIGN PATENT DOCUMENTS

| EP | 1 783 520 | 5/2007 | |
| EP | 2530499 | * 12/2012 | ............ G02B 27/286 |

OTHER PUBLICATIONS

International Search Report (ISA/KR) dated Aug. 6, 2009 for co-owned App No. PCT/US2008/082538.
(Continued)

*Primary Examiner* — George G King
(74) *Attorney, Agent, or Firm* — Maschoff Brennan

(57) ABSTRACT

A diffraction grating comprises a substrate (with index $n_{sub}$) with a surface facing an optical medium (with index $n_{med} < n_{sub}$), a dielectric or semiconductor layer of thickness t on the substrate surface (with index $n_L \neq n_{sub}$), and a set of diffractive elements on the layer (with index $n_R \neq n_{med}$). The diffractive elements comprise a set of ridges protruding into the optical medium, which fills trenches between the ridges, and are characterized by a spacing $\Lambda$, a width d, and a height h. Over an operational wavelength range, $\lambda/2n_{sub} < \Lambda < \lambda/(n_{sub} + n_{med})$. An optical signal incident on the diffractive elements from within the substrate at an incidence angle exceeding the critical angle, $n_{sub}$, $n_{med}$, $n_L$, $n_R$, $\Lambda$, d, h, and t result in wavelength-dependent, first-order diffraction efficiency of the grating greater than a prescribed level over the operational wavelength range for both s- and p-polarized optical signals.

17 Claims, 12 Drawing Sheets

(52) U.S. Cl.
CPC ......... *G02B 5/1814* (2013.01); *G02B 5/1847* (2013.01); *G02B 5/1857* (2013.01); *G02B 5/1866* (2013.01); *G02B 5/1871* (2013.01); G02B 2005/1804 (2013.01)

(58) Field of Classification Search
CPC .. G02B 5/1804; G02B 5/1814; G02B 5/1857; G02B 5/1861
USPC .................. 359/350, 359, 558–576
See application file for complete search history.

(56) References Cited

U.S. PATENT DOCUMENTS

| | | | |
|---|---|---|---|
| 4,604,329 A | 8/1986 | Reber | |
| 4,725,511 A | 2/1988 | Reber | |
| 5,007,708 A | 4/1991 | Gaylord et al. | |
| 5,080,465 A | 1/1992 | Laude | |
| 5,276,745 A | 1/1994 | Revelli | |
| 5,377,044 A | 12/1994 | Tomono et al. | |
| 6,067,197 A | 5/2000 | Blasiak et al. | |
| 6,067,392 A | 5/2000 | Wakami et al. | |
| 6,170,297 B1 | 1/2001 | Jang et al. | |
| 6,208,463 B1 | 3/2001 | Hansen et al. | |
| 6,426,837 B1 | 7/2002 | Clark et al. | |
| 6,434,299 B1 | 8/2002 | Yudin et al. | |
| 6,449,096 B1 | 9/2002 | Fabiny et al. | |
| 6,693,749 B2 | 2/2004 | King et al. | |
| 6,813,080 B2 | 11/2004 | Raguin et al. | |
| 6,839,173 B2 | 1/2005 | Shimmo et al. | |
| 6,987,590 B2 | 1/2006 | Phillips et al. | |
| 7,019,904 B2 | 3/2006 | Shiozaki et al. | |
| 7,109,904 B2 | 9/2006 | Fotouhi | |
| 7,164,532 B2 | 1/2007 | Funato et al. | |
| 7,167,615 B1 | 1/2007 | Wawro et al. | |
| 7,257,288 B1 | 8/2007 | Strasser et al. | |
| 7,454,103 B2 | 11/2008 | Parriaux | |
| 7,474,396 B2 | 1/2009 | Wu et al. | |
| 7,688,512 B2 | 3/2010 | Kittaka et al. | |
| 8,040,607 B2 | 10/2011 | Miller | |
| 8,165,436 B2 | 4/2012 | Mossberg et al. | |
| 8,233,218 B1 | 7/2012 | Mossberg et al. | |
| 8,270,079 B1 | 9/2012 | Mossberg et al. | |
| 8,314,989 B1 | 11/2012 | Mossberg et al. | |
| 8,593,732 B1 | 11/2013 | Greiner et al. | |
| 8,885,252 B1 | 11/2014 | Mossberg et al. | |
| 8,989,537 B2 | 3/2015 | Mossberg et al. | |
| 9,025,247 B1 | 5/2015 | Mossberg et al. | |
| 2002/0135876 A1 | 9/2002 | Holm et al. | |
| 2002/0191286 A1 | 12/2002 | Gale et al. | |
| 2003/0011769 A1 | 1/2003 | Rakuljic et al. | |
| 2003/0092075 A1 | 5/2003 | Pepper | |
| 2004/0021945 A1 | 2/2004 | Tompkin et al. | |
| 2004/0125374 A1 | 7/2004 | Berger et al. | |
| 2004/0196556 A1 | 10/2004 | Cappiello et al. | |
| 2005/0070027 A1 | 3/2005 | Gollier et al. | |
| 2005/0088739 A1 | 4/2005 | Chiu et al. | |
| 2005/0088744 A1 | 4/2005 | Smith et al. | |
| 2005/0226557 A1 | 10/2005 | Trutna et al. | |
| 2006/0001969 A1 | 1/2006 | Wang et al. | |
| 2006/0023310 A1 | 2/2006 | Putnam et al. | |
| 2006/0024013 A1 | 2/2006 | Magnusson et al. | |
| 2006/0193550 A1 | 8/2006 | Wawro et al. | |
| 2006/0274415 A1 | 12/2006 | Murata | |
| 2007/0053635 A1 | 3/2007 | Iazikov et al. | |
| 2007/0146884 A1 | 6/2007 | Shiozaki et al. | |
| 2008/0106789 A1 | 5/2008 | Hirai et al. | |
| 2008/0138013 A1 | 6/2008 | Parriaux | |
| 2008/0158570 A1 | 7/2008 | Gollier et al. | |
| 2008/0180693 A1 | 7/2008 | Dillon et al. | |
| 2008/0259348 A1 | 10/2008 | Judell et al. | |
| 2008/0316485 A1 | 12/2008 | Wawro et al. | |
| 2009/0041971 A1 | 2/2009 | Wang et al. | |
| 2009/0052030 A1 | 2/2009 | Kaida et al. | |
| 2009/0059375 A1 | 3/2009 | Hoose | |
| 2009/0324212 A1 | 12/2009 | Dillon et al. | |
| 2010/0092124 A1 | 4/2010 | Magnusson et al. | |
| 2010/0208262 A1* | 8/2010 | Yoshida .................. G01J 3/02 356/328 |
| 2010/0277937 A1 | 11/2010 | Ilzuka et al. | |
| 2011/0043918 A1 | 2/2011 | Crouse et al. | |
| 2011/0080640 A1 | 4/2011 | Kaida et al. | |
| 2012/0275746 A1 | 11/2012 | Mossberg et al. | |
| 2014/0044393 A1* | 2/2014 | Magnusson ............ G02B 5/203 385/37 |
| 2014/0146390 A1 | 5/2014 | Kaempfe et al. | |
| 2014/0198380 A1* | 7/2014 | Pesala ............... H01L 31/02168 359/359 |
| 2015/0185413 A1 | 7/2015 | Mossberg et al. | |
| 2015/0369976 A1* | 12/2015 | Magnusson .......... G02B 5/1861 359/572 |
| 2016/0274281 A1* | 9/2016 | Lutolf ................. G02B 5/1852 |

OTHER PUBLICATIONS

Perry; High-efficiency multilayer dielectric diffraction gratings; Optics Letters, vol. 20, No. 8, pp. 940-942 (1995).
Wang et al, Deep-etched high-density fused-silica transmission gratings with high efficiency at a wavelength of 1550 nm, Applied Optics, vol. 45 p. 2567 (2006).
Popov et al; "Backside diffraction by relief gratings"; Optics Communications vol. 65 No. 2, p. 97 (Jan. 15, 2988).
Smith et al; "Diffraction gratings utilizing total internal reflection facets in Littrow configuration"; IEEE Photonics Technology Letters vol. 11 No. 1, p. 84 (Jan. 1999).
International Search Report (ISA/KR) dated Jul. 31, 2015 for counterpart App No. PCT/US2015/028088.

* cited by examiner

REFLECTIVE DIFFRACTION GRATINGS EMPLOYING EFFICIENCY ENHANCEMENT OR ETCH BARRIER LAYERS

BENEFIT CLAIMS TO RELATED APPLICATIONS

This application claims benefit of U.S. provisional App. No. 61/985,405 filed Apr. 28, 2014 in the names of Christoph M. Greiner, Thomas W. Mossberg, and Dmitri Iazikov, said provisional application being hereby incorporated by reference as if fully set forth herein.

FIELD OF THE INVENTION

The field of the present invention relates to diffraction gratings. In particular, diffraction gratings, and methods for their fabrication, are disclosed that include one or more additional layers that can provide one or more of improved diffraction efficiency, reduced polarization-dependent loss, or more reproducible fabrication.

BACKGROUND

Several examples of diffraction gratings that include one or more layers for enhancing diffraction efficiency are disclosed in the following co-owned patents and applications, each of which is incorporated by reference as if fully set forth herein:

U.S. Pat. No. 8,989,537 entitled "Highly efficient optical gratings with reduced thickness requirements and impedance-matching layers" issued Mar. 24, 2015 to Greiner et al;

U.S. Pat. No. 8,593,732 entitled "Partially metallized total internal reflection immersion grating" issued Nov. 26, 2013 to Greiner et al;

U.S. Pat. No. 8,165,436 entitled "Highly efficient optical gratings with reduced thickness requirements and impedance-matching layers" issued Apr. 24, 2012 to Greiner et al;

U.S. Pat. Pub. No. 2012/0275746 entitled "Highly efficient optical gratings with reduced thickness requirements and impedance-matching layers" published Nov. 1, 2012 in the names of Greiner et al;

U.S. non-provisional application Ser. No. 14/659,986 entitled "Highly efficient optical gratings with reduced thickness requirements and impedance-matching layers" filed Mar. 17, 2015 in the names of Greiner et al;

U.S. non-provisional application Ser. No. 14/045,814 entitled "Partially metallized total internal reflection immersion grating" filed Oct. 4, 2013 in the names of Greiner et al; and U.S. non-provisional application Ser. No. 13/725,952 entitled "Highly efficient optical transmission gratings" filed Dec. 21, 2012 in the names of Greiner et al.

Several examples of immersion gratings are described in the following references, each of which is incorporated by reference as if fully set forth herein:

Popov et al, "Backside diffraction by relief gratings," Optics Communications Vol. 65 No. 2, p. 97 (15 Jan. 1988);

Smith et al, "Diffraction gratings utilizing total internal reflection facets in Littrow configuration," IEEE Photonics Technology Letters Vol. 11 No. 1, p. 84 (January 1999); and U.S. Pat. No. 6,813,080 entitled "Metal-free gratings for wavelength-multiplexed optical communications" issued Nov. 2, 2004 to Raguin et al.

SUMMARY

A diffraction grating comprises a substrate, a dielectric or semiconductor layer, and a set of diffractive elements. The substrate comprises a dielectric or semiconductor substrate material substantially transparent over a range of operational wavelengths with a substrate refractive index $n_{sub}$, and has a first surface facing an optical medium with a medium refractive index $n_{med}$ that is less than $n_{sub}$. The dielectric or semiconductor layer is formed on the first surface of the substrate, substantially transparent over the operational wavelength range, and characterized by a layer refractive index $n_L$ (that differs from both $n_{sub}$ and $n_{med}$) and a layer thickness t. The set of diffractive elements is formed on the layer on the first surface of the substrate. The diffractive elements comprise a set of protruding ridges of a dielectric or semiconductor ridge material. The ridge material is substantially transparent over the operational wavelength range and has a ridge refractive index $n_R$ that differs from $n_{med}$. The ridges are characterized by a ridge spacing $\Lambda$, a ridge width d, and a ridge height h; and are separated by intervening trenches substantially filled with the optical medium. Over the operational wavelength range, $\lambda/2n_{sub} < \Lambda < \lambda/(n_{sub}+n_{med})$. For an optical signal incident on the diffractive elements from within the substrate at an incidence angle $\theta_n$ that exceeds a critical angle $\theta_c = \sin^{-1}(n_{med}/n_{sub})$, $n_{sub}$, $n_{med}$, $n_L$, $n_R$, $\Lambda$, d, h, and t result in wavelength-dependent, first-order diffraction efficiency of the grating greater than a prescribed level over the operational wavelength range for both s- and p-polarized optical signals.

Objects and advantages pertaining to reflective diffraction gratings may become apparent upon referring to the example embodiments illustrated in the drawings and disclosed in the following written description or appended claims. Subject matter disclosed herein may be related to subject matter disclosed in one or more of the references incorporated above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
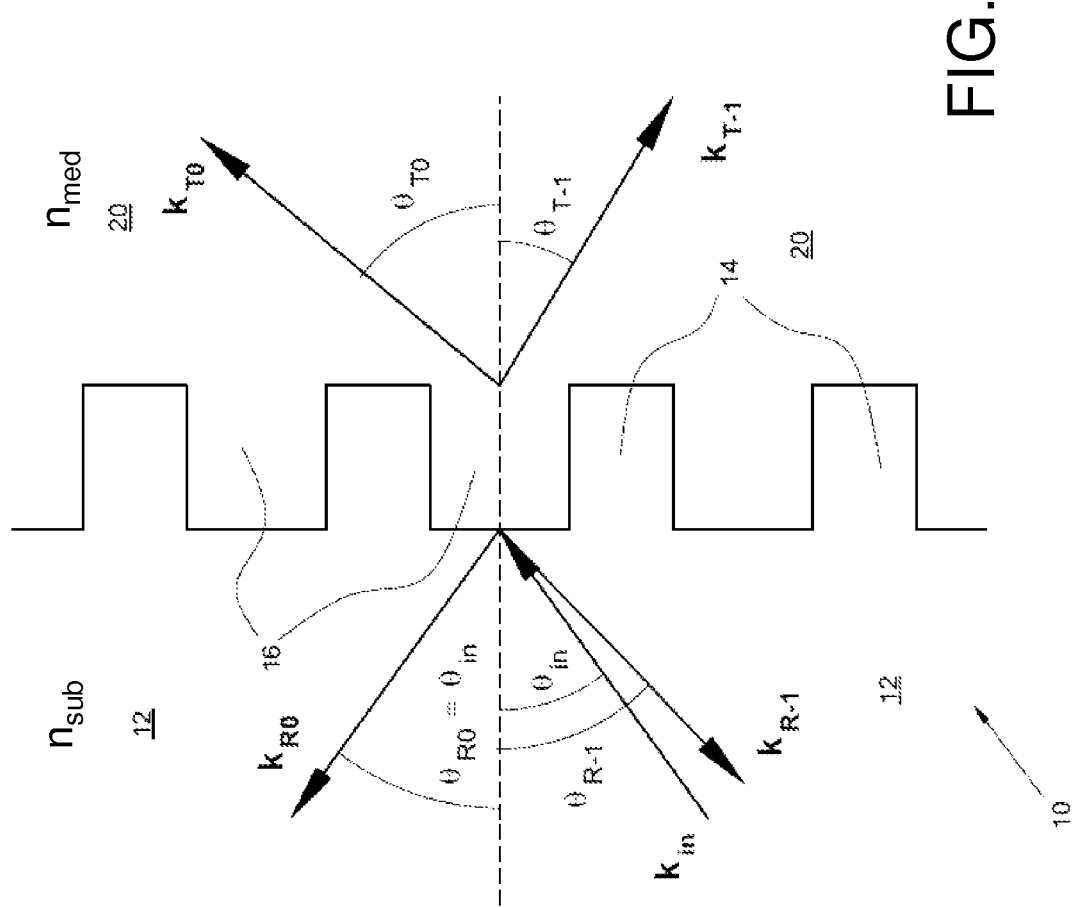
FIG. 1 illustrates schematically an optical signal incident on a conventional diffraction grating (operated as an immersion grating) resulting in refracted (m=0), reflected (m=0), transmitted first-order diffracted (m=−1), and reflected first-order-diffracted (m=−1) optical signals.

The embodiments depicted are shown only schematically: all features may not be shown in full detail or in proper proportion, certain features or structures may be exaggerated relative to others for clarity, and the drawings should not be regarded as being to scale. For example, the actual optical gratings depicted as having a handful of diffractive lines (e.g., ridges) typically have hundreds or thousands of lines per millimeter; the number of grating lines is reduced in the drawings for clarity. In addition, the height, depth, or width of each grating line can be reduced or exaggerated relative to, e.g., the thickness of an underlying layer or substrate. The embodiments shown are only examples: they should not be construed as limiting the scope of the present disclosure or appended claims.

DETAILED DESCRIPTION OF EMBODIMENTS

The diffraction gratings disclosed herein comprise a diffractive structure located at an interface between optical media having differing refractive indices $n_{sub}>n_{med}$, and are typically arranged as so-called immersion gratings wherein an input optical signal at wavelength $\lambda$ propagates in the high-index medium (substrate 12; index $n_{sub}$) and is incident on the grating at an incident angle $\theta_{in}$. The low-index medium 20 (index $n_{med}$) is often air or other gaseous medium; other low-index media, including liquid or solid media, can be employed. The grating 10 has a line spacing of $\Lambda$. Generally, output optical signals can propagate away from the grating in one or more reflected diffractive orders (back into the high-index substrate) or one or more transmitted diffractive orders (into the low-index medium) at corresponding diffracted angles $\theta_{d,m}$ according to the grating equation ($n_{med}$ sin $\theta_{d,m} - n_{sub}$ sin $\theta_{in}=m\lambda/\Lambda$ into the low-index medium; $n_{sub}$ sin $\theta_{d,m} - n_{sub}$ sin $\theta_{in}=m\lambda/\Lambda$ into the high-index substrate; m is an integer in both cases; angles measured from the grating normal with the customary sign conventions). A conventional example is shown schematically in FIG. 1 and includes the incident optical signal, a refracted signal (i.e., transmitted with m=0; zero-order), a specularly reflected signal (i.e., reflected with m=0; zero order), and first-order diffracted signals (both transmitted and reflected with m=−1).

For a given optical signal wavelength $\lambda$, the grating line spacing $\Lambda$ and input signal incidence angle $\theta_n$ can be selected so that the grating exhibits no non-zero-order diffracted orders in the low-index medium (i.e., no transmitted diffracted orders for m≠0); choosing $\theta_{in}$ to exceed the critical angle for total internal reflection also precludes any zero-order transmission (i.e., refraction; m=0) into the low-index medium. Suitable choice of $\Lambda$ and $\theta_{in}$ can also limit reflected diffractive orders within the high-index medium to zero-order (i.e., specular reflection; m=0) and first-order (i.e., m=−1 according to the customary sign conventions). Such an example is shown schematically in FIG. 2 and includes the incident optical signal, a specularly reflected signal (reflected with m=0; zero order), and a first-order reflected diffracted signal (reflected with m=−1).

FIG. 1 illustrates schematically a cross sectional view of a conventional diffraction grating 10. The cross section is substantially perpendicular to the grating lines, which in this example comprise ridges 14 and intervening trenches 16 on a first surface of a substrate 12. The ridges 14 are shown as rectangular in cross section, but this need not be the case; other ridge shapes can be employed, e.g., trapezoidal, triangular, sinusoidal, and so forth. The substrate 12 comprises a material having a refractive index $n_{sub}$. The diffraction grating 10 can be characterized by a grating spacing $\Lambda$, and the first substrate surface faces an optical medium 20 having a refractive index $n_{med}$ with $n_{med}<n_{sub}$. The substrate material and optical medium are substantially transparent within the spectral range of interest (i.e., over an operational range of wavelengths $\lambda$). In a common arrangement, the optical medium 20 comprises ambient air or other gaseous medium; any suitable solid, liquid, or gaseous material, or vacuum, can be employed as the low-index optical medium 20. Any suitable substrate material can be employed as the high-index medium 12; common examples include optical glass, fused silica, silicon, silicon nitride, silicon oxynitride, aluminum oxide (sapphire), various semiconductors or semiconductor oxides, various metal oxides, various polymers, other dielectric or semiconductor materials, and so forth.

In FIG. 1, an input optical signal with wave vector $k_{in}$ and vacuum wavelength is incident on the grating 10 from within the substrate 12 (i.e., from the high-index side of the grating, so that grating 10 can be referred to as an immersion grating). The optical signal is incident at incidence angle $\theta_{in}$ with respect to the grating normal. In the example of FIG. 1, $n_{med}$, $n_{sub}$, and $\Lambda$ are chosen so that only one transmitted and one reflected diffraction order can be present (first-order diffracted signals with m=−1), in addition to the transmitted and reflected zero-order optical signals (signals with m=0). In addition, in FIG. 1, $\theta_{in} < \theta_c$, where $\theta_c$ is the critical angle beyond which total internal reflection occurs (i.e., $\theta_c = \sin^{-1}(n_{med}/n_{sub})$). Under the conditions of FIG. 1, the immersion grating 10 (i) diffracts a transmitted optical signal (transmitted negative first order, wave vector $k_{T-1}$) that exits the grating at angle $\theta_{T-1}$, (ii) refracts a zero-order transmitted optical signal with wave vector $k_{T0}$ at angle $\theta_{T0}$ (iii) diffracts a reflected optical signal (reflected negative first order, wave vector $k_{R-1}$) that back diffracts at angle $\theta_{R-1}$, and (iv) reflects a zero-order reflected optical signal with wave vector $k_{R0}$ (specular reflection) at angle $\theta_{R0}$. Angle $\theta_{R0}$ is related to $\theta_{in}$ by the law of reflection; angle $\theta_{T0}$ is related to $\theta_{in}$ by the law of refraction (i.e., Snell's Law); angles $\theta_{T-1}$ and $\theta_{R-1}$ are related to $\theta_{in}$ by the grating equations given above.

For many applications, e.g., optical signal transmission, it is desirable for the diffraction grating to diffract incident optical signals with relatively high efficiency (e.g., greater than about 80%, greater than about 85%, greater than about 90%, greater than about 95%, or even higher) over a substantial spectral range (e.g., about 800-900 nm, about 1500-1600 nm, or other operational visible or infrared wavelength range) into only a single non-zero diffracted order, so as to avoid unnecessary optical loss while providing wavelength-dependent redirection of optical signals. The presence of undesirable output pathways such as specular reflection, non-diffracted transmission, and undesired diffracted orders, can make it difficult to design a diffraction grating with sufficiently high efficiency of diffraction into only the desired diffracted order or with a sufficiently broad spectral range of high diffraction efficiency. Consequently, it can be beneficial to eliminate undesirable energy output pathways so as to enable reduction of optical loss in the desired diffracted order.

Figure 2:
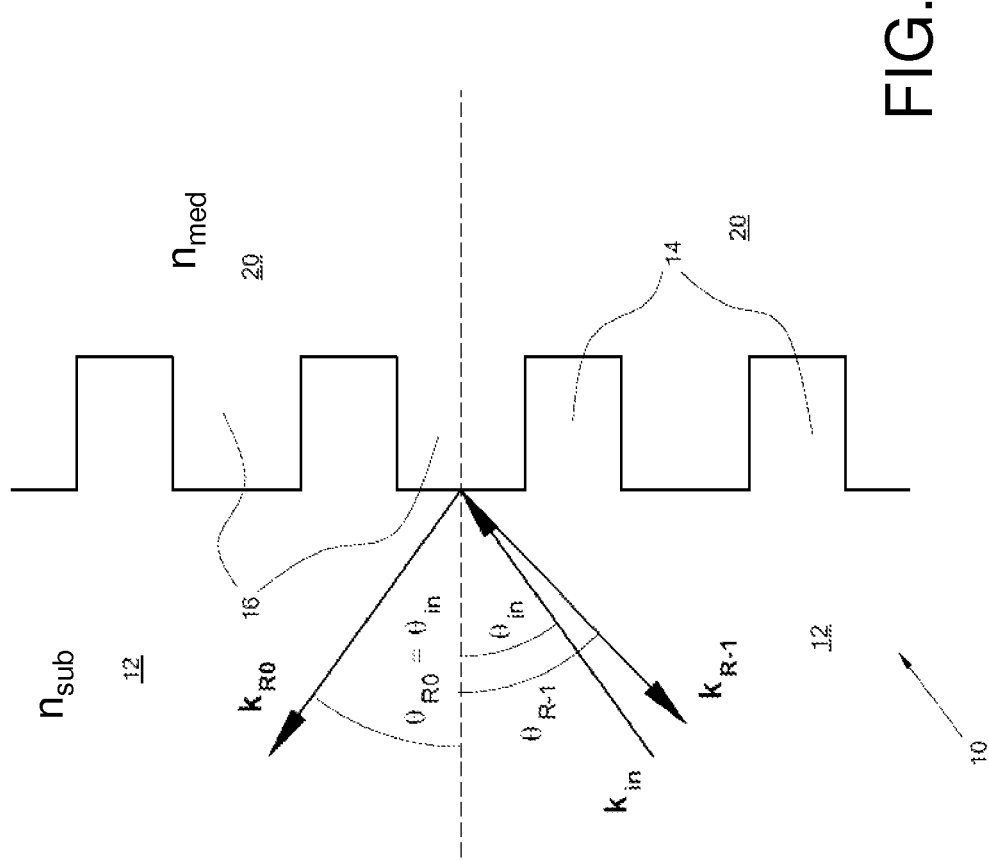
FIG. 2 illustrates schematically an optical signal incident on a conventional diffraction grating (operated as an immersion grating) resulting in only reflected (m=0) and reflected first-order diffracted (m=−1) optical signals.
Figure 12:
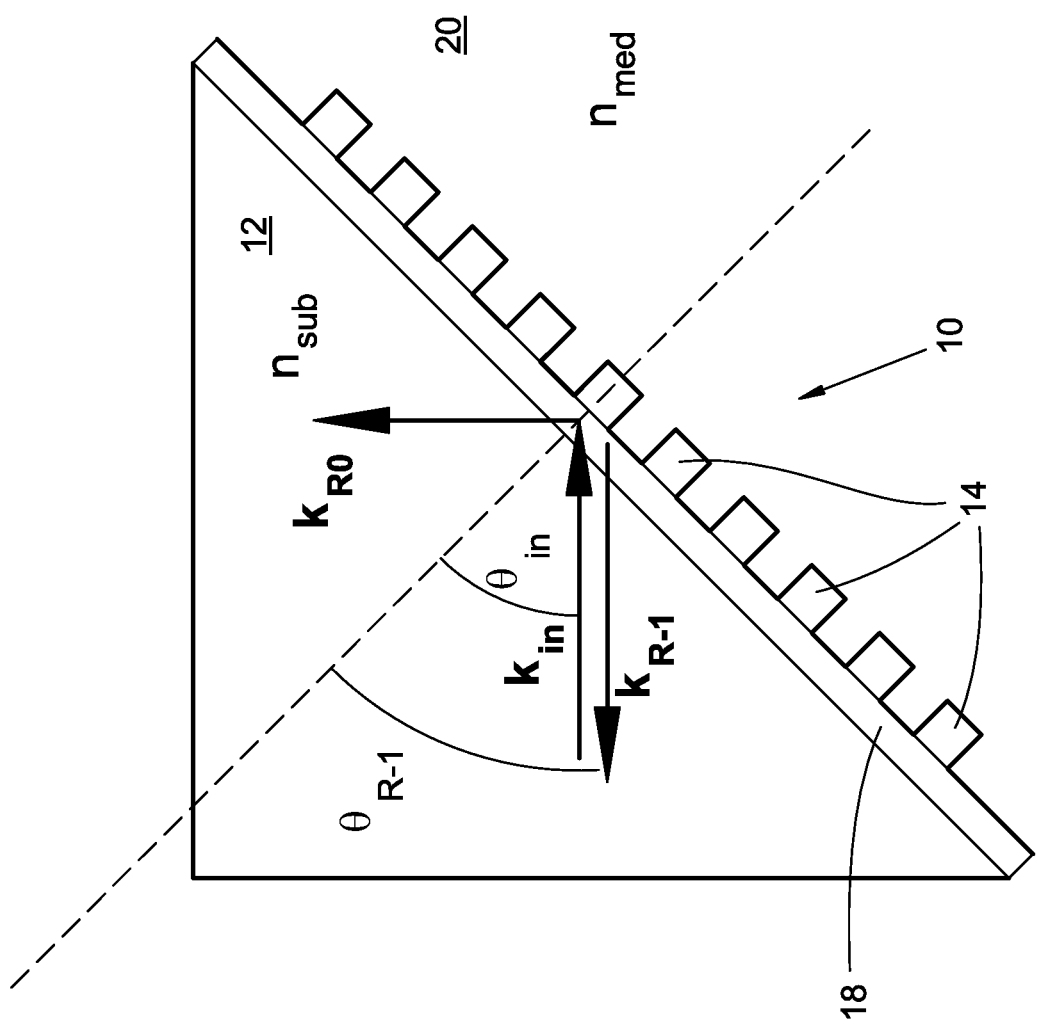
FIG. 12 illustrates schematically an example of an inventive diffraction grating including ridges formed on a layer formed on a prism surface and used as an immersion grating.

An example of elimination of transmitted output pathways (refracted and diffracted) is illustrated schematically in FIG. 2. The grating spacing Λ has been chosen so that, for an incident optical signal of wavelength λ, (i) $\Lambda < k/(n_{med} + n_{sub}) < \lambda/n_{sub}$ and (ii) $\lambda/2n_{sub} < \Lambda$. Condition (i) implies that, for an optical signal incident from the high index side of the diffraction grating 10, no diffraction into the low index medium can occur and diffracted orders higher than the first diffracted order are absent within the high index medium. Condition (ii) implies that first-order diffraction within the high index medium is possible. Additionally, if the incidence angle is larger than the critical angle (i.e., if $\theta_{in} > \theta_c$, with $\theta_c = \sin^{-1}(n_{med}/n_{sub})$), then no zero-order transmission (i.e., refraction) can occur and the input optical signal undergoes total internal reflection. An entrance face of the substrate that is not parallel to the grating surface (e.g., as in the example prism grating of FIG. 12) typically is employed so that an optical signal transmitted through the first surface is incident on the diffractive elements from within the substrate at an incidence angle $\theta_{in}$ that exceeds the critical angle $\theta_c$. Under those conditions, the only remaining output pathways are (i) the reflected zero-order signal (i.e., specular total internal reflection) and (ii) the reflected first-order diffracted signal, both of which occur within the high index medium 12. By suitably arranging the morphology of the diffraction grating, nearly 100% of the incident optical signal energy can be directed as the reflected first-order diffracted signal; various examples of such arrangements of grating morphology are demonstrated in the following disclosed example embodiments.

By tuning grating morphology parameters such as duty cycle (i.e., d/Λ where d is the groove width), ridge height h (i.e., groove depth), and thickness t and refractive index $n_L$ of a diffraction-efficiency-enhancement layer, highly efficient reflection gratings can be designed and fabricated in which only a single reflected non-zero-order diffracted grating order contains close to 100% of the incident signal energy. In addition, if the enhancement layer material is suitably chosen to act also as an etch barrier during grating fabrication, precise control over grating groove depth h is gained and the yield of highly efficient diffraction gratings can be significantly improved.

Figure 3:
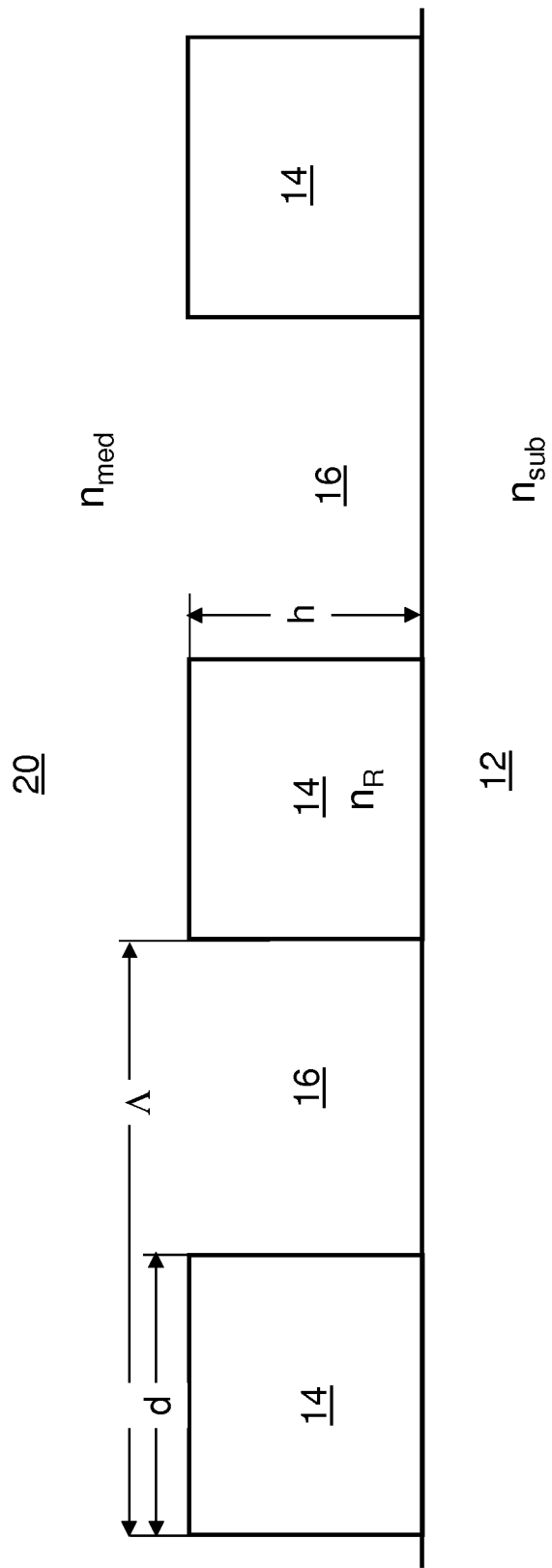
FIG. 3 illustrates schematically a conventional diffraction grating comprising ridges having index $n_R$ that are formed on a substrate having index $n_{sub}$ and that protrude into an optical medium having index $n_{med}$.

FIG. 3 illustrates schematically an example diffraction grating in which the ridges 14 comprise a material having a diffractive index $n_R$ differing from $n_{sub}$ and $n_{med}$. In a specific example, the ridges 14 comprise silicon nitride (SiN; $n_R=1.98$) ridges formed on N-SK2 optical glass (the high-index substrate 12; $n_{sub}=1.589$) and protruding into air (the low-index medium 20; $n_{med}=1$). The ridges 14 are separated by grooves 16 filled with the low-index medium and are characterized by the grating spacing Λ, a ridge height h, and a ridge width d. For a grating spacing Λ=590 nm and an optical signal having wavelength=1545 nm and incident at $\theta_{in}=57.3°$, no transmitted orders (zero- or non-zero-order) can exist in air, and inside the substrate only zero-order specular reflection (m=0) and reflected first-order diffraction (m=−1) are present (as in FIG. 2).

Figure 4B:
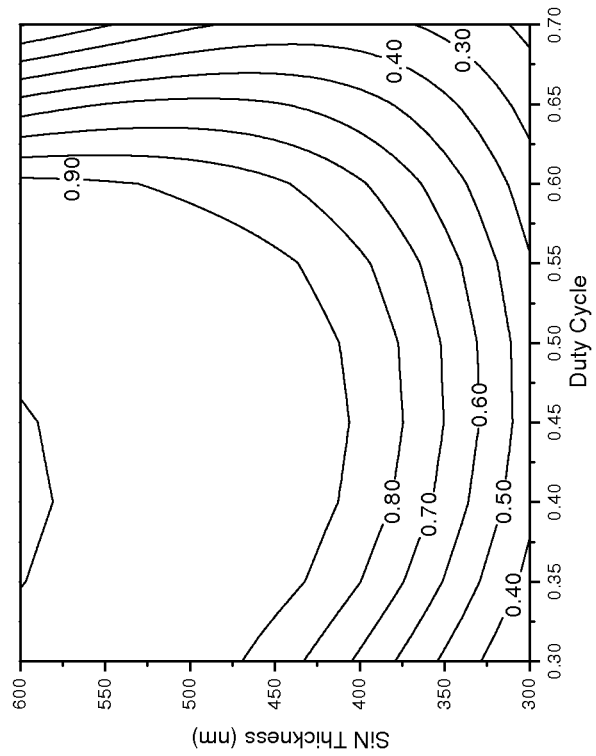
FIGS. 4A and 4B are contour plots of reflected first-order diffraction efficiency for TE and TM polarizations, respectively, as a function of ridge duty cycle d/$\Lambda$ and ridge height h for the diffraction grating of FIG. 3 operated as an immersion grating with $n_R=1.98$, $n_{sub}=1.589$, $n_{med}=1$, $\Lambda=590$ nm, $\lambda=1545$ nm, and $\theta_{in}=57.3°$.
Figure 4A:
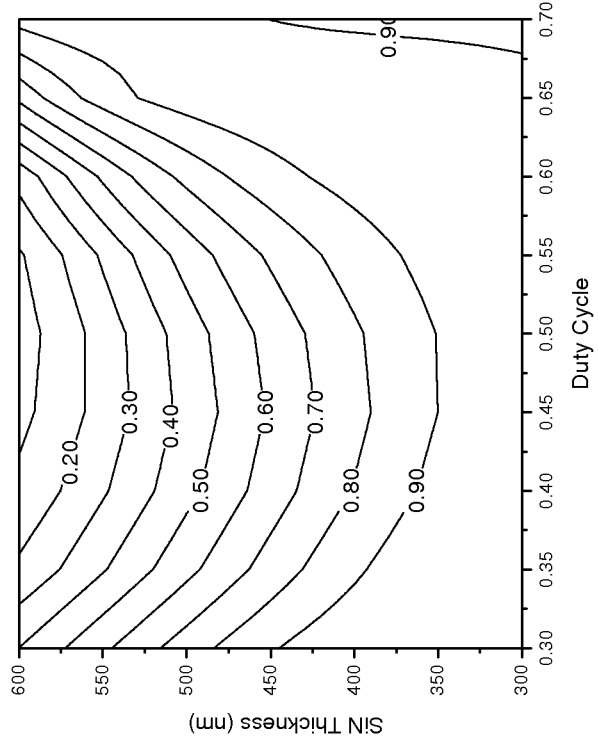

FIGS. 4A and 4B are contour plots of the diffraction efficiency of the reflected first-order (m=−1) diffracted order as a function of ridge height h (i.e., groove height) and duty cycle d/Λ for TE and TM polarizations, respectively, for λ=1545 nm and $\theta_{in}=57.3°$ for the example of FIG. 3 with $n_R=1.98$, $n_{sub}=1.589$, and $n_{med}=1$ (e.g., employing the materials listed in the preceding paragraph). For TE (TM) polarization the electric field vector is parallel (perpendicular) to the grating lines. Areas of high efficiency (e.g., >90%) exist for each polarization, but they do not substantially overlap. The grating of FIG. 3 therefore exhibits a substantial level of polarization-dependent loss (PDL; i.e., polarization-dependent diffraction efficiency at a given wavelength). Non-negligible PDL may be acceptable in certain circumstances and unacceptable in others.

Figure 5:
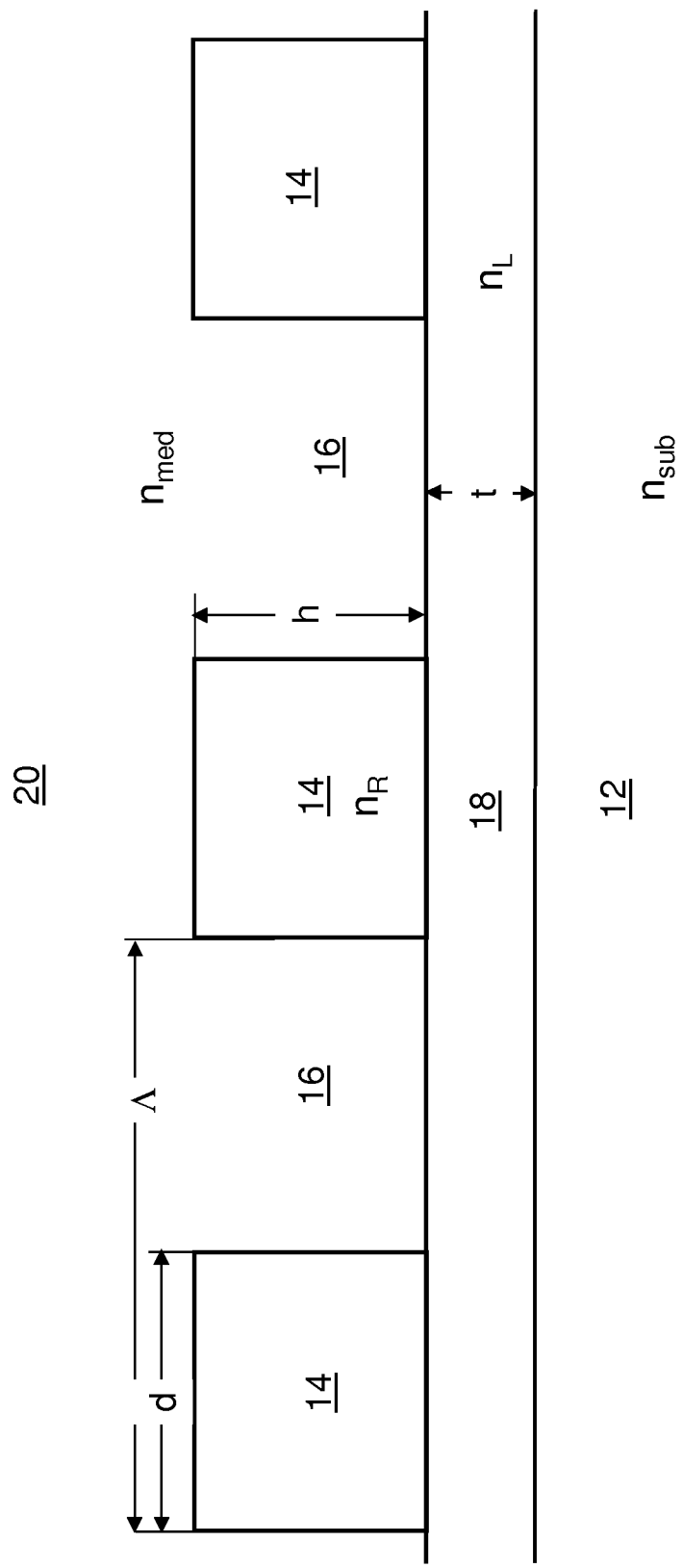
FIG. 5 illustrates schematically an example of an inventive diffraction grating comprising ridges having index $n_R$ that are formed on a layer having index $n_L$ on a substrate having index $n_{sub}$ and that protrude into an optical medium having index $n_{med}$.
Figures 6A, 6B:
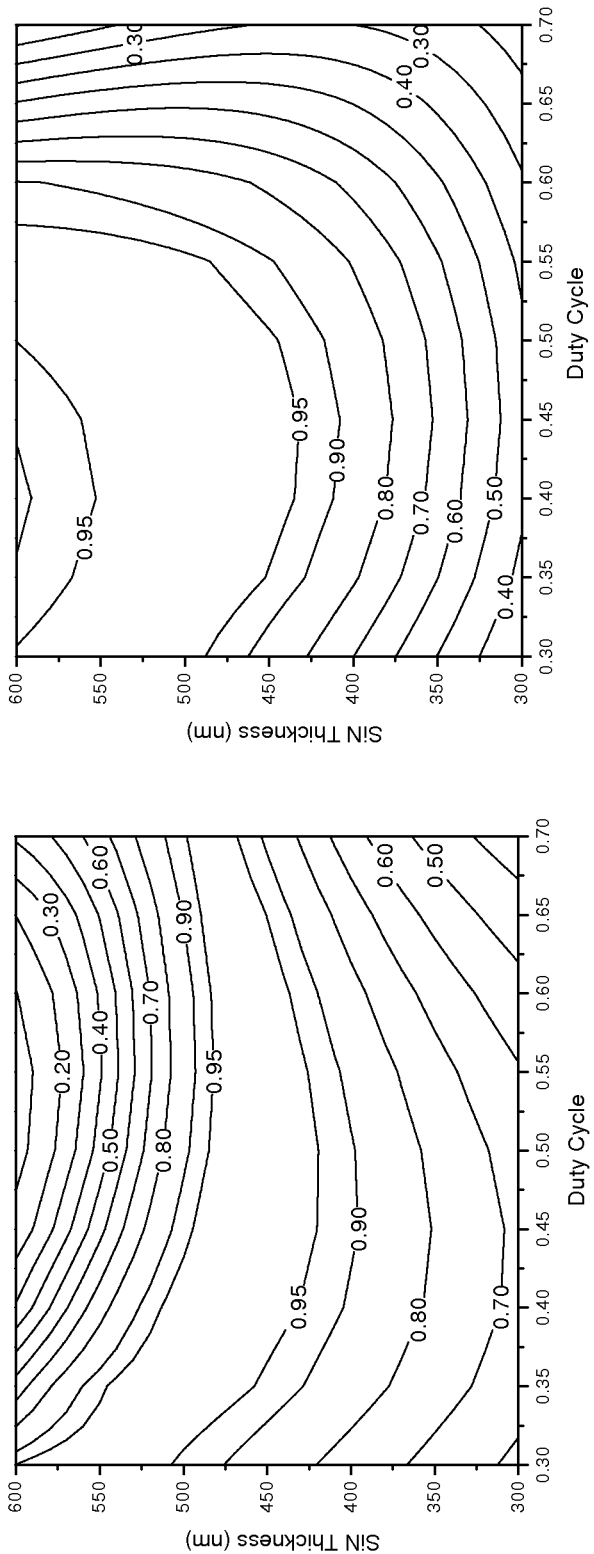
FIGS. 6A and 6B are contour plots of reflected first-order diffraction efficiency for TE and TM polarizations, respectively, as a function of ridge duty cycle $d/\Lambda$ and ridge height h for the example diffraction grating of FIG. 5 operated as an immersion grating with $n_R=1.98$, $n_L=2.35$, $n_{sub}=1.589$, $n_{med}=1$, $\Lambda=590$ nm, t=65 nm, $\lambda=1545$ nm, and $\theta_{in}=57.3°$.

FIG. 5 illustrates an example arrangement of a diffraction grating similar to the arrangement of FIG. 3 but with the addition of a diffraction-efficiency-enhancement layer 18 on the substrate 12 beneath the ridges 14. The material of the layer 18 differs from the material of the substrate 12, so that $n_{sub} \neq n_L$. In some specific examples of a grating arranged as in FIG. 5, the enhancement layer 18 comprises amorphous silicon ($n_L=2.35$) of thickness t between the ridges 14 comprising silicon nitride ($n_R=1.98$) and the substrate 12 comprising N-SK2 optical glass ($n_{sub}=1.589$); the ridges 14 protrude into air ($n_{med}=1$). FIGS. 6A and 6B are contour plots of the resulting diffraction efficiency of the reflected first-order (m=−1) diffracted order as a function of silicon nitride thickness (i.e., grating ridge height h) and duty cycle d/Λ for TE and TM polarizations, respectively, at λ=1545 nm, $\theta_{in}=57.3°$, and t=65 nm. Introduction of the diffraction-efficiency-enhancement layer 18 shifts the area of high efficiency (e.g., >90%) for TE polarization while leaving that of TM polarization relatively unchanged. Subsections of high efficiency areas (e.g., >90%) for both polarizations overlap. A grating having the enhancement layer 18 and formed with groove height h and duty cycle d/Λ lying in the region of overlap can exhibit reduced or negligible polarization-dependent loss (PDL) as well as high overall diffraction efficiency.

Figure 7:
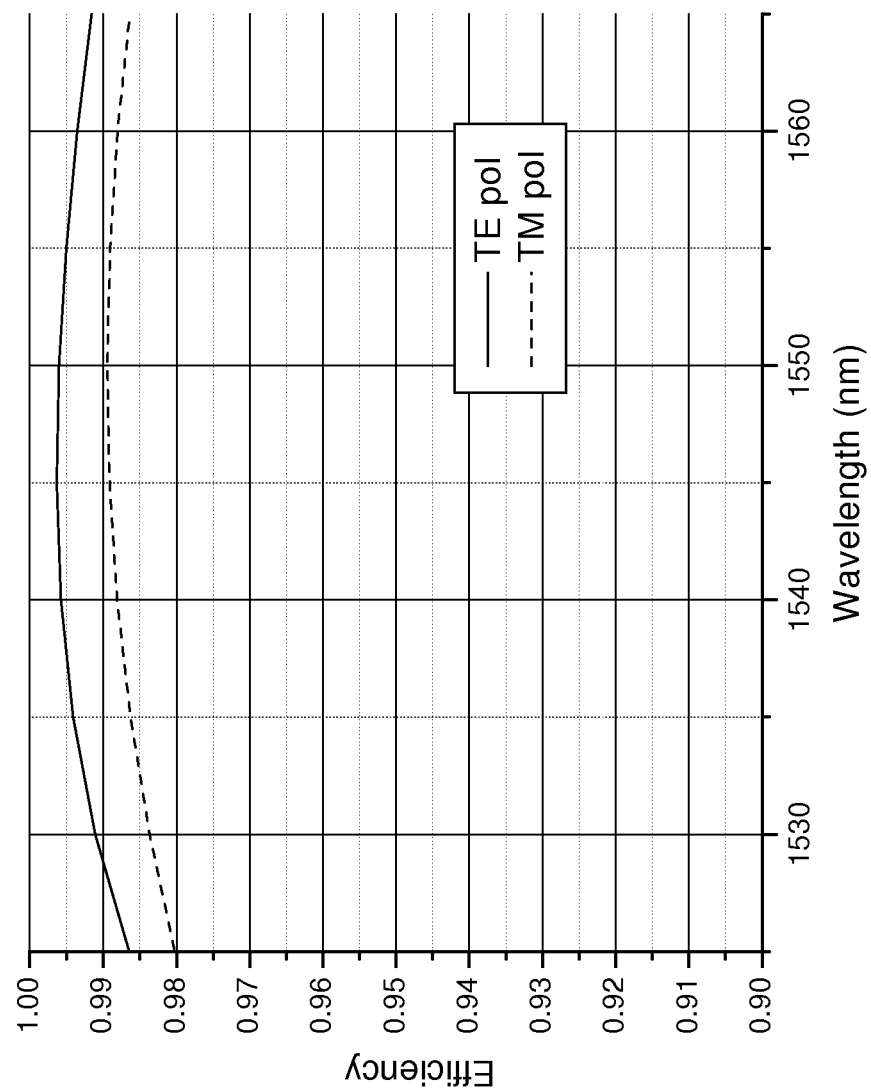
FIG. 7 is a graph of reflected first-order diffraction efficiency for TE and TM polarization as a function of wavelength for the example diffraction grating of FIG. 5 operated as an immersion grating with $n_R=1.98$, $n_L=2.35$, $n_{sub}=1.589$, $n_{med}=1$, $\Lambda=590$ nm, $d/\Lambda=0.41$, t=65 nm, h=470 nm, and $\theta_{in}=57.3°$.

The presence of the enhancement layer 18 provides two additional parameters (enhancement layer thickness t and layer refractive index $n_L$) that enable fabrication of reflective immersion diffraction gratings exhibiting high efficiency (e.g., greater than about 80%, greater than about 85%, greater than about 90%, greater than about 95%, or even higher) that can be nearly independent of polarization (e.g., polarization dependent loss less than about 2%, less than about 1%, or even lower) over a desired operational wavelength range. Other optical properties of the enhancement layer 18 can be exploited as well for achieving desired diffraction grating performance, such as absorptive or dispersive optical properties (polarization-dependent or polarization-independent). FIG. 7 is a plot of the reflected first-order (m=−1) diffraction efficiency of the preceding example grating for TE and TM polarization as a function of wavelength over the Telecom C-band spectral range (1530 nm<λ<1565 nm) for $\theta_{in}$=57.3°, duty cycle d/Λ=0.41, and h=470 nm, i.e., parameters lying in the overlapping regions of >95% diffraction efficiency for both polarizations from FIGS. 6A and 6B. The diffraction efficiency or the polarization-dependent loss of other, similar examples can be similarly improved or optimized over other desired wavelength ranges by selection of corresponding suitable grating parameters.

Figure 10:
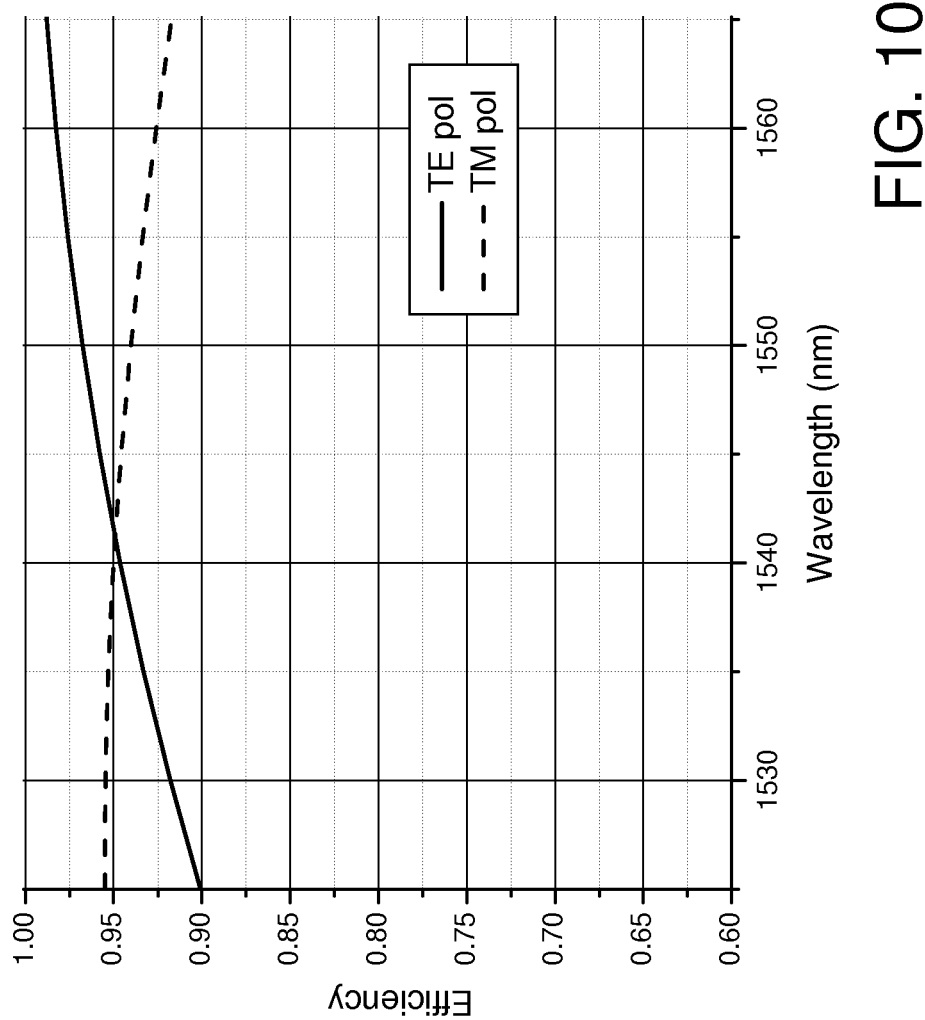
FIG. 10 is a graph of reflected first-order diffraction efficiency for TE and TM polarization as a function of wavelength for the example diffraction grating of FIG. 5 operated as an immersion grating with $n_R=1.98$, $n_L=1.71$, $n_{sub}=1.589$, $n_{med}=1$, $\Lambda=590$ nm, $d/\Lambda=0.30$, h=500 nm, t=240 nm, and $\theta_{in}=57.3°$.
Figure 11:
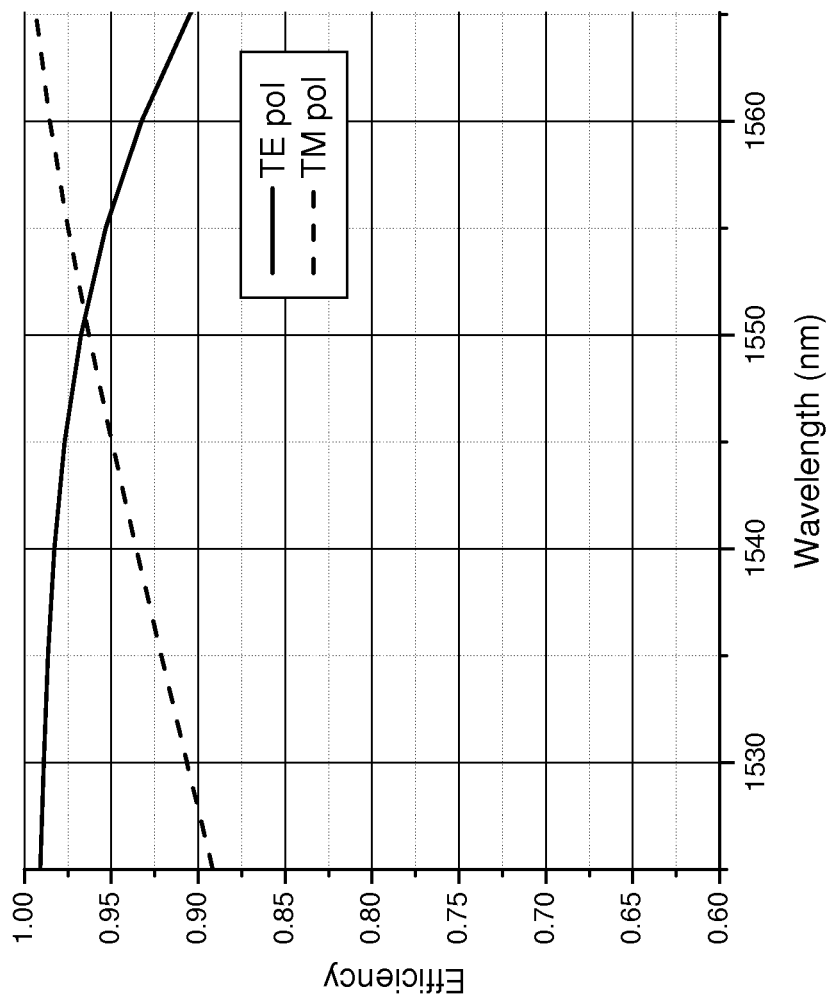
FIG. 11 is a graph of reflected first-order diffraction efficiency for TE and TM polarization as a function of wavelength for the example diffraction grating of FIG. 5 operated as an immersion grating with $n_R=1.98$, $n_L=1.45$, $n_{sub}=1.589$, $n_{med}=1$, $\Lambda=590$ nm, $d/\Lambda=0.627$, h=500 nm, t=500 nm, and $\theta_{in}=57.3°$.

In another specific example of a grating arranged as in FIG. 5, the substrate 12 comprises N-SK2 optical glass ($n_{sub}$=1.589), the layer 18 comprises silicon oxynitride ($n_L$=1.71), the ridges 14 comprise silicon nitride ($n_R$=1.98); the optical medium 20 comprises air ($n_{med}$=1), Λ=590 nm, d/Λ=0.30, h=500 nm, and t=240 nm. For $\theta_{in}$=57.3°, the resulting diffraction efficiencies for s- and p-polarization are shown in FIG. 10 over a range of 1525 nm<λ<1565 nm; diffraction efficiencies remain about 90% for both polarizations across that range. In still another specific example of a grating arranged as in FIG. 5, the substrate 12 comprises N-SK2 optical glass ($n_{sub}$=1.589), the layer 18 comprises silica ($n_L$=1.45), the ridges 14 comprise silicon nitride ($n_R$=1.98); the optical medium 20 comprises air ($n_{med}$=1), Λ=590 nm, d/Λ=0.627, h=500 nm, and t=500 nm. For $\theta_{in}$=57.3°, the resulting diffraction efficiencies for s- and p-polarization are shown in FIG. 11 over a range of 1525 nm<λ<1565 nm; diffraction efficiencies remain about 90% for both polarizations across nearly all of that range.

Figure 8:
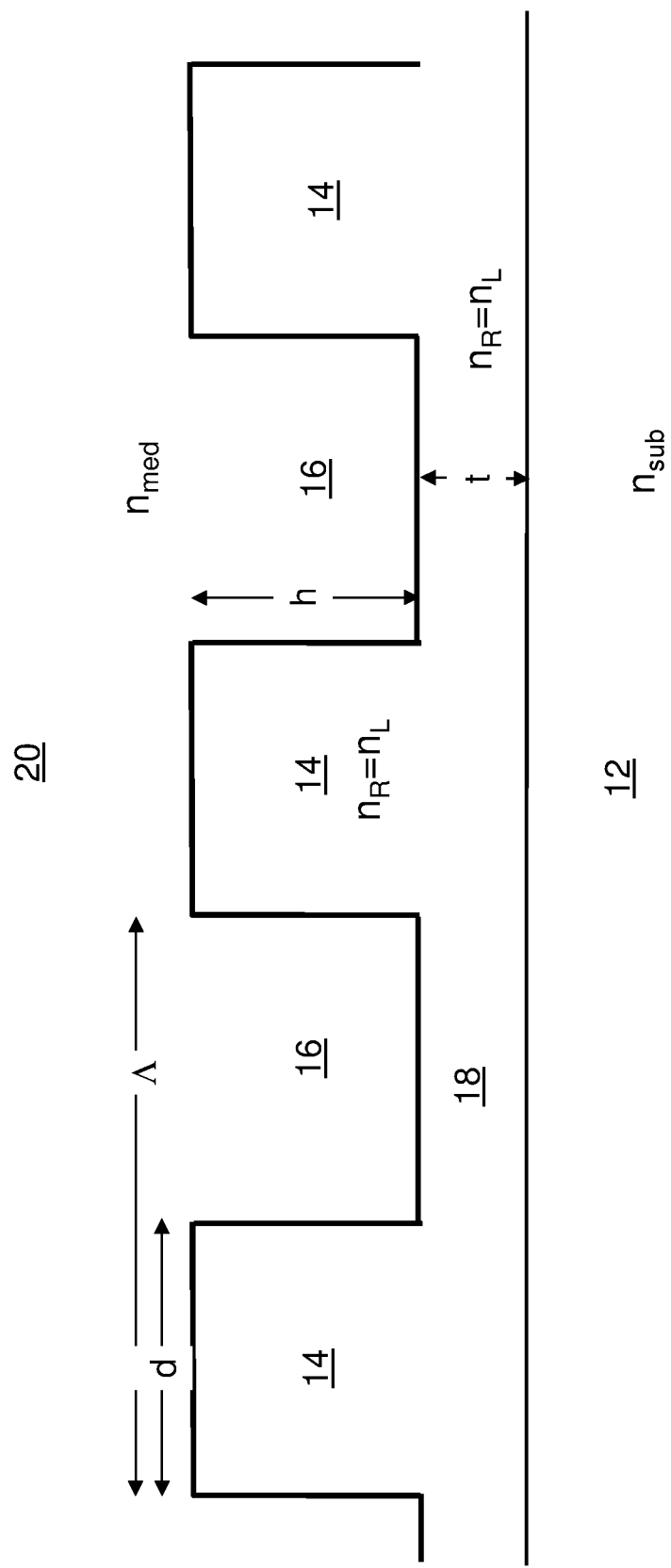
FIG. 8 illustrates schematically another example of an inventive diffraction grating comprising ridges having index $n_R$ that are formed on a layer having index $n_L=n_R$ on a substrate having index $n_{sub}$ and that protrude into an optical medium having index $n_{med}$.
Figure 9:
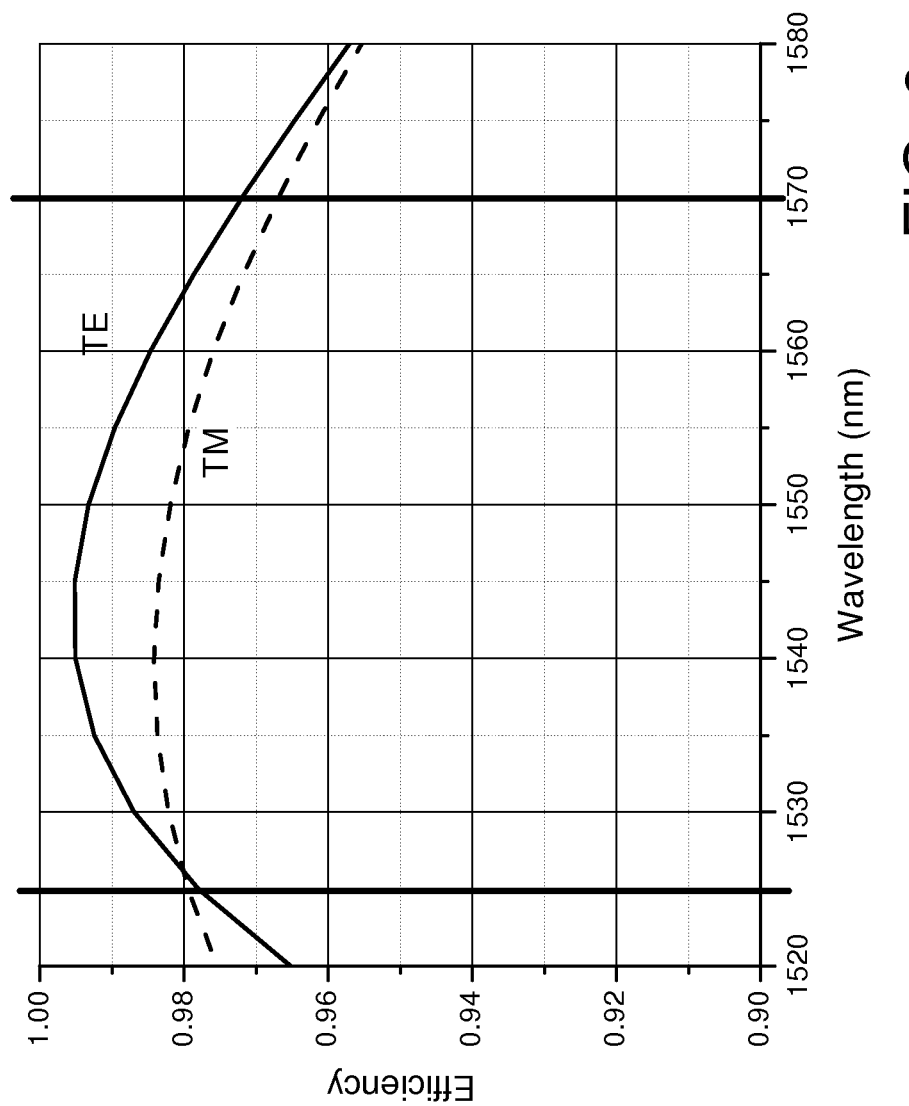
FIG. 9 is a graph of reflected first-order diffraction efficiency for TE and TM polarization as a function of wavelength for the example diffraction grating of FIG. 8 operated as an immersion grating with $n_R=n_L=1.98$, $n_{sub}=1.589$, $n_{med}=1$, $\Lambda=590$ nm, $d/\Lambda=0.34$, h=500 nm, t=135 nm, and $\theta_n=57.3°$.

Generally, the differing refractive indices $n_{sub}$ and $n_L$ result in the behaviors depicted in FIGS. 6A, 6B, 7, 10, and 11. In the example of FIG. 5 the enhancement layer 18 comprises a material that differs from the material of the ridges 14 so that $n_R \neq n_L$. In the example of FIG. 8, the ridges and the enhancement layer comprise the same material; more generally in such examples, the ridges 14 and the enhancement layer 18 have the same refractive index (i.e., $n_R = n_L$). For one specific example of the arrangement of FIG. 8 ($n_R = n_L$=1.98 (ridges 14 and layer 18 of SiN), $n_{sub}$=1.589 (substrate 12 of N-SK2 optical glass), and $n_{med}$=1 (air), t=135 nm, Λ=590 nm, d=200 nm, and h=500 nm), FIG. 9 is a plot of the reflected first-order (m=−1) diffraction efficiency of the grating of FIG. 8 for TE and TM polarization as a function of wavelength for 1520 nm<λ<1580 nm and $\theta_{in}$=57.3°. Diffraction efficiency greater than about 96% is observed over the telecom C-Band wavelength range with polarization-dependent loss less than about 2% over that range. The diffraction efficiency or the polarization-dependent loss of other examples similar to FIG. 8 can be similarly improved or optimized over other desired wavelength ranges by selection of corresponding suitable grating parameters.

For the specific examples plotted in FIGS. 6A, 6B, 7, 10, and 11 (for example gratings arranged as in FIG. 5) and in FIG. 9 (for an example grating arranged according to FIG. 8), the corresponding example gratings include specific examples of materials for the low-index optical medium 20 (air), the high-index substrate 12 (N-SK2 optical glass), the ridges 14 (SiN), and the enhancement layer 18 (amorphous silicon, silicon oxynitride, silica); those are provided only as examples. Any suitable materials, including material not explicitly disclosed herein, can be employed for the low-index optical medium 20, the high-index substrate 12, the ridges 14, and enhancement layer 18 within the scope of the present disclosure or appended claims to form a grating exhibiting desired behavior over a selected operational wavelength range. For example, the following general relations between $n_{med}$, $n_{sub}$, $n_R$, and $n_L$ can be employed to yield desirable grating behavior over a selected operational wavelength range with corresponding suitable choices of Λ, d, h, and t: (i) $n_{med}<n_{sub}<n_L<n_R$ (e.g., FIGS. 5 and 10); (ii) $n_{med}<n_L<n_{sub}<n_R$ (e.g., FIGS. 5 and 11); (iii) $n_{med}<n_{sub}<n_R<n_L$ (e.g., FIGS. 5, 6A, 6B, and 7); (iv) $n_{med}<n_R<n_{sub}<n_L$; (v) $n_{med}<n_R<n_L<n_{sub}$; (vi) $n_{med}<n_L<n_R<n_{sub}$; (vii) $n_{med}<n_L<n_{sub}=n_R$; (viii) $n_{med}<n_{sub}=n_R<n_L$; (ix) $n_{med}<n_{sub}<n_R=n_L$ (e.g., FIGS. 8 and 9); and (x) $n_{med}<n_L=n_R<n_{sub}$. Note that in examples with two indices equal to each other, the corresponding structures (ridge, layer, etc.) can comprise the same material, or differing materials having substantially the same refractive index.

Selection of a material for the enhancement layer 18 that differs from the material for the ridges 14 can be advantageous for grating fabrication. In the examples of FIG. 5 or FIG. 8, the grating ridges 14 can be fabricated by spatially selective etching of a substantially uniform layer of the ridge material, e.g., after photolithographic patterning of a photoresist layer overlaid on the ridge material layer. Etching through the patterned photoresist transfers the pattern into the ridge material layer. For the grating of FIG. 8 wherein the ridge material and the enhancement layer material are the same, achieving the appropriate etch depth (i.e., ridge height h) to yield sufficiently high diffraction efficiency or sufficiently low polarization-dependent loss can require very accurate and precise process control, timing, and knowledge of the etch rates involved. Routine process fluctuations or lack of process control can result in an etch depth that is too deep or too shallow relative to the target depth that yields the desired grating performance.

Instead of relying on a timed etch to achieve the ridge height h, a material different from that of the grating ridges 14 can be employed for the enhancement layer 18 (as in FIG. 5); that material can be chosen not only to exhibit the desired optical properties (sufficient transparency; refractive index $n_L$, which can be the same as or differ from the refractive index $n_R$ of the ridge material) but also to function as an etch barrier or an etch stop. Such a material is not etched by the etch process employed to etch the grating ridge material, or at least is etched at a substantially slower rate. If such an etch barrier is employed, the accuracy of the ridge height h depends almost entirely on the accuracy of the thickness of the ridge material originally present on the substrate material. That thickness typically can be controlled within significantly tighter tolerance compared to the tolerance of a timed etch depth. Grating fabrication then simply proceeds by selecting an etch time that is long enough to etch entirely through the layer of ridge material. Any suitable etch barrier material can be employed; many examples are known in semiconductor processing arts, including, but not limited to, amorphous silicon, tantalum pentoxide, aluminum oxide, chromium metal, titanium oxide, and so forth.

The exemplary values given for $n_{med}$, $n_{sub}$, $n_R$, $n_L$, $\Lambda$, d, h, t, and $\theta_{in}$ are only a few among myriad combinations of values for those parameters that can be employed within the scope of the present disclosure or appended claims. For example, given a wavelength range and desired diffractive and polarization properties, one or more suitable combinations of those parameters can be selected according to the teachings of the present disclosure by one skilled in the art, based on calculation or experiment, to yield the desired grating behavior.

Generally, operationally acceptable grating performance can include performance in terms of diffraction efficiency and polarization-dependent loss such as those shown in FIGS. 6A, 6B, 7, and 9 through 11. However, immersion gratings disclosed or claimed herein should not be viewed as limited to such values. Rather, different uses of an optical grating may have more or less stringent requirements for grating performance, or more or less restrictive constraints based on ease or cost of fabrication, and the term operationally acceptable performance is defined in the context of the relevant use.

While the exemplary gratings disclosed herein have been described primarily in the context of use as immersion gratings under conditions of total internal reflection and only a single permitted diffractive order, it should be understood that gratings fabricated as disclosed or claimed herein (e.g., with an enhancement layer 18 between the grating ridges 14 and the substrate 12) can be employed in other arrangements that permit multiple diffraction orders or transmitted diffraction orders.

In addition to the preceding, the following examples fall within the scope of the present disclosure or appended claims:

Example 1

A diffraction grating comprising: (a) a substrate comprising a dielectric or semiconductor substrate material substantially transparent over a range of operational wavelengths $\lambda$ with a substrate refractive index $n_{sub}$, and having a first surface facing an optical medium with a medium refractive index $n_{med}$ that is less than $n_{sub}$; (b) a dielectric or semiconductor layer formed on the first surface of the substrate, substantially transparent over the operational wavelength range, and characterized by a layer refractive index $n_L$ and a layer thickness t, wherein $n_L$ differs from both $n_{sub}$ and $n_{med}$; (c) a set of diffractive elements formed on the layer on the first surface of the substrate, wherein (i) the diffractive elements comprise a set of protruding ridges of a dielectric or semiconductor ridge material, (ii) the ridge material is substantially transparent over the operational wavelength range and has a ridge refractive index $n_R$ that differs from $n_{med}$, (iii) the ridges are characterized by a ridge spacing $\Lambda$, a ridge width d, and a ridge height h, and (iv) the ridges are separated by intervening trenches substantially filled with the optical medium, wherein: (d) $\lambda/2n_{sub} < \Lambda < \lambda/(n_{sub}+n_{med})$ over the operational wavelength range; and (e) $n_{sub}$, $n_{med}$, $n_L$, $n_R$, $\Lambda$, d, h, and t result in wavelength-dependent, first-order diffraction efficiency of the grating greater than a prescribed level over the operational wavelength range for both s- and p-polarized optical signals incident on the diffractive elements from within the substrate at an incidence angle $\theta_{in}$ that exceeds a critical angle $\theta_c = \sin^{-1}(n_{med}/n_{sub})$.

Example 2

The diffraction grating of Example 1 wherein the operational wavelength range is from about 1500 nm to about 1600 nm.

Example 3

The diffraction grating of Example 1 wherein the operational wavelength range is from about 1525 nm to about 1565 nm.

Example 4

The diffraction grating of Example 1 wherein the operational wavelength range is from about 1250 nm to about 1350 nm.

Example 5

The diffraction grating of Example 1 wherein the operational wavelength range is from about 850 nm to about 950 nm.

Example 6

The diffraction grating of any one of Examples 1 through 5 wherein the prescribed level of diffraction efficiency is about 80%.

Example 7

The diffraction grating of any one of Examples 1 through 5 wherein the prescribed level of diffraction efficiency is about 90%.

Example 8

The diffraction grating of any one of Examples 1 through 7 wherein a maximum of the p-polarized diffraction efficiency substantially coincides with a maximum of the s-polarized diffraction efficiency, so that polarization dependent loss PDL is less than a prescribed level over the operational wavelength range for an optical signal incident on the diffractive elements from within the substrate at an incidence angle $\theta_{in}$ that exceeds a critical angle $\theta_c = \sin^{-1}(n_{med}/n_{sub})$.

Example 9

The diffraction grating of Example 8 wherein the prescribed level of polarization dependent loss is about 0.5 dB.

Example 10

The diffraction grating of any one of Examples 1 through 9 wherein the substrate comprises a prism having second surface that is not parallel to the first surface, wherein the first and second surfaces are arranged so that an optical signal transmitted through the first surface is incident on the diffractive elements from within the substrate at an incidence angle $\theta_{in}$ that exceeds the critical angle $\theta_c$.

Example 11

The diffraction grating of any one of Examples 1 through 10 wherein: (i) the substrate is arranged so as to receive an optical signal in the operational wavelength range that is incident on the diffractive elements from within the substrate at an incidence angle $\theta_{in}$ that exceeds the critical angle $\theta_c$; and (ii) $n_{sub}$, $n_{med}$, $\lambda$, and $\theta_{in}$ result in near-Littrow diffraction of the optical signal.

Example 12

The diffraction grating of any one of Examples 1 through 11 wherein the substrate material comprises optical glass, doped or undoped silica, silicon nitride, silicon oxynitride, silicon, one or more semiconductors, one or more semiconductor oxides, or one or more metal oxides.

Example 13

The diffraction grating of any one of Examples 1 through 12 wherein the optical medium comprises vacuum, air, a gaseous medium, or a liquid medium.

Example 14

The diffraction grating of any one of Examples 1 through 13 wherein the ridge material comprises silicon nitride, silicon oxynitride, silicon, one or more semiconductors, one or more semiconductor oxides, or one or more metal oxides.

Example 15

The diffraction grating of any one of Examples 1 through 14 wherein the layer comprises silicon nitride, silicon oxynitride, silicon, one or more semiconductors, or one or more semiconductor oxides, or one or more metal oxides.

Example 16

The diffraction grating of any one of Examples 1 through 15 wherein $n_{med} < n_{sub} < n_L < n_R$.

Example 17

The diffraction grating of any one of Examples 1 through 15 wherein $n_{med} < n_L < n_{sub} < n_R$.

Example 18

The diffraction grating of any one of Examples 1 through 15 wherein $n_{med} < n_{sub} < n_R < n_L$.

Example 19

The diffraction grating of any one of Examples 1 through 15 wherein $n_{med} < n_R < n_{sub} < n_L$.

Example 20

The diffraction grating of any one of Examples 1 through 15 wherein $n_{med} < n_R < n_L < n_{sub}$.

Example 21

The diffraction grating of any one of Examples 1 through 15 wherein $n_{med} < n_L < n_R < n_{sub}$.

Example 22

The diffraction grating of any one of Examples 1 through 15 wherein $n_{med} < n_L < n_{sub} = n_R$.

Example 23

The diffraction grating of any one of Examples 1 through 15 wherein $n_{med} < n_{sub} = n_R < n_L$.

Example 24

The diffraction grating of any one of Examples 1 through 15 wherein $n_{med} < n_{sub} < n_R = n_L$.

Example 25

The diffraction grating of any one of Examples 1 through 15 wherein $n_{med} < n_L = n_R < n_{sub}$.

Example 26

The diffraction grating of any one of Examples 24 or 25 wherein the layer and the ridges comprise the same material.

Example 27

A method for forming the diffraction grating of Example 26, the method comprising etching to an etch depth substantially equal to the ridge height h a substantially uniform layer of the ridge material, on the first surface of the substrate, of thickness substantially equal to a sum of the ridge height h and the layer thickness t.

Example 28

A method for forming the diffraction grating of any one of Examples 1 through 25, the method comprising etching to an etch depth substantially equal to the ridge height h a substantially uniform layer of the ridge material, on the dielectric or semiconductor layer on the first surface of the substrate, of thickness substantially equal to the ridge height h.

Example 29

The method of Example 28 wherein the dielectric or semiconductor layer on the first surface of the substrate comprises a material that exhibits an etch rate substantially smaller than an etch rate exhibited by the ridge material.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A diffraction grating comprising:
   (a) a substrate comprising a dielectric or semiconductor substrate material substantially transparent over a selected range of operational wavelengths k with a substrate refractive index $n_{sub}$, and having a first surface facing an optical medium with a medium refractive index $n_{med}$ that is less than $n_{sub}$; wherein the selected operational wavelength range is one of: from about 1500 nm to about 1600 nm, from about 1250 nm to about 1350 nm, or from about 850 nm to about 950 nm;
   (b) a dielectric or semiconductor layer formed on the first surface of the substrate, substantially transparent over the selected operational wavelength range, and characterized by a layer refractive index and a layer thickness t, wherein $n_L$ differs from both $n_{sub}$ and $n_{med}$;
   (c) a set of diffractive elements formed on the layer on the first surface of the substrate, wherein (i) the diffractive elements comprise a set of protruding ridges of a dielectric or semiconductor ridge material, (ii) the ridge material is substantially transparent over the selected operational wavelength range and has a ridge refractive index $n_R$ that differs from $n_{med}$, (iii) the ridges are characterized by a ridge spacing $\Lambda$, a ridge width d, and a ridge height h, and (iv) the ridges are separated by intervening trenches substantially filled with the optical medium,
   wherein:
   (d) $\lambda/2n_{sub} < \Lambda < \lambda/(n_{sub}+n_{med})$ over the selected operational wavelength range, thereby substantially precluding (i) diffraction of any non-zero order into the optical medium, and (ii) diffraction of any second- or higher-order within the substrate, of any portion of an optical signal incident on the diffractive elements from within the substrate; and
   (e) $n_{sub}$, $n_{med}$, $n_L$, $n_R$, $\Lambda$, d, h, and t result in wavelength-dependent, first-order diffraction efficiency of the grating, for first-order diffraction within the substrate, greater than a prescribed level over the selected operational wavelength range for both s- and p-polarized optical signals incident on the diffractive elements from within the substrate at an incidence angle $\theta_{in}$ that exceeds a critical angle $\theta_c = \sin^{-1}(n_{med}/n_{sub})$, wherein the prescribed level of diffraction efficiency is greater than 80%.

2. The diffraction grating of claim 1 wherein the selected operational wavelength range is from about 1525 nm to about 1565 nm.

3. The diffraction grating of claim 1 wherein the prescribed level of diffraction efficiency is greater than 90%.

4. The diffraction grating of claim 1 wherein a maximum of the p-polarized diffraction efficiency substantially coincides with a maximum of the s-polarized diffraction efficiency, so that polarization dependent loss PDL is less than a prescribed level over the selected operational wavelength range for the optical signal incident on the diffractive elements from within the substrate at the incidence angle $\theta_{in}$ that exceeds the critical angle $\theta_c = \sin^{-1}(n_{med}/n_{sub})$.

5. The diffraction grating of claim 4 wherein the prescribed level of polarization dependent loss PDL is 0.5 dB.

6. The diffraction grating of claim 1 wherein the substrate comprises a prism having second surface that is not parallel to the first surface, wherein the first and second surfaces are arranged so that an optical signal transmitted through the first surface is incident on the diffractive elements from within the substrate at an incidence angle $\theta_{in}$ that exceeds the critical angle $\theta_c$.

7. The diffraction grating of claim 1 wherein:
   (i) the substrate is arranged so as to receive an optical signal in the selected operational wavelength range that is incident on the diffractive elements from within the substrate at an incidence angle $\theta_{in}$ that exceeds the critical angle $\theta_c$; and
   (ii) $n_{sub}$, $n_{med}$, $\Lambda$, and $\theta_{in}$ result in near-Littrow diffraction of the optical signal.

8. The diffraction grating of claim 1 wherein the substrate material comprises optical glass, doped or undoped silica, silicon nitride, silicon oxynitride, silicon, one or more semiconductors, one or more semiconductor oxides, or one or more metal oxides.

9. The diffraction grating of claim 1 wherein the optical medium comprises vacuum, air, a gaseous medium, or a liquid medium.

10. The diffraction grating of claim 1 wherein the ridge material comprises silicon nitride, silicon oxynitride, silicon, one or more semiconductors, one or more semiconductor oxides, or one or more metal oxides.

11. The diffraction grating of claim 1 wherein the layer comprises silicon nitride, silicon oxynitride, silicon, one or more semiconductors, one or more semiconductor oxides, or one or more metal oxides.

12. The diffraction grating of claim 1 wherein $n_L \neq n_R$.

13. The diffraction grating of claim 1 wherein $n_L = n_R$.

14. The diffraction grating of claim 13 wherein the layer and the ridges comprise the same material.

15. A method for forming the diffraction grating of claim 14, the method comprising etching to an etch depth substantially equal to the ridge height h a substantially uniform layer of the ridge material, on the first surface of the substrate, of thickness substantially equal to a sum of the ridge height h and the layer thickness t.

16. A method for forming the diffraction grating of claim 1, the method comprising etching to an etch depth substantially equal to the ridge height h a substantially uniform layer of the ridge material, on the dielectric or semiconductor layer on the first surface of the substrate, of thickness substantially equal to the ridge height h.

17. The method of claim 16 wherein the dielectric or semiconductor layer on the first surface of the substrate comprises a material that exhibits an etch rate substantially smaller than an etch rate exhibited by the ridge material.

* * * * *